Sept. 18, 1951  G. W. MOORE  2,568,354
TABLE EASEL

Filed July 15, 1950  2 Sheets-Sheet 1

INVENTOR.
GEORGE W. MOORE
BY
Abraham Friedman

Sept. 18, 1951  G. W. MOORE  2,568,354
TABLE EASEL
Filed July 15, 1950  2 Sheets-Sheet 2
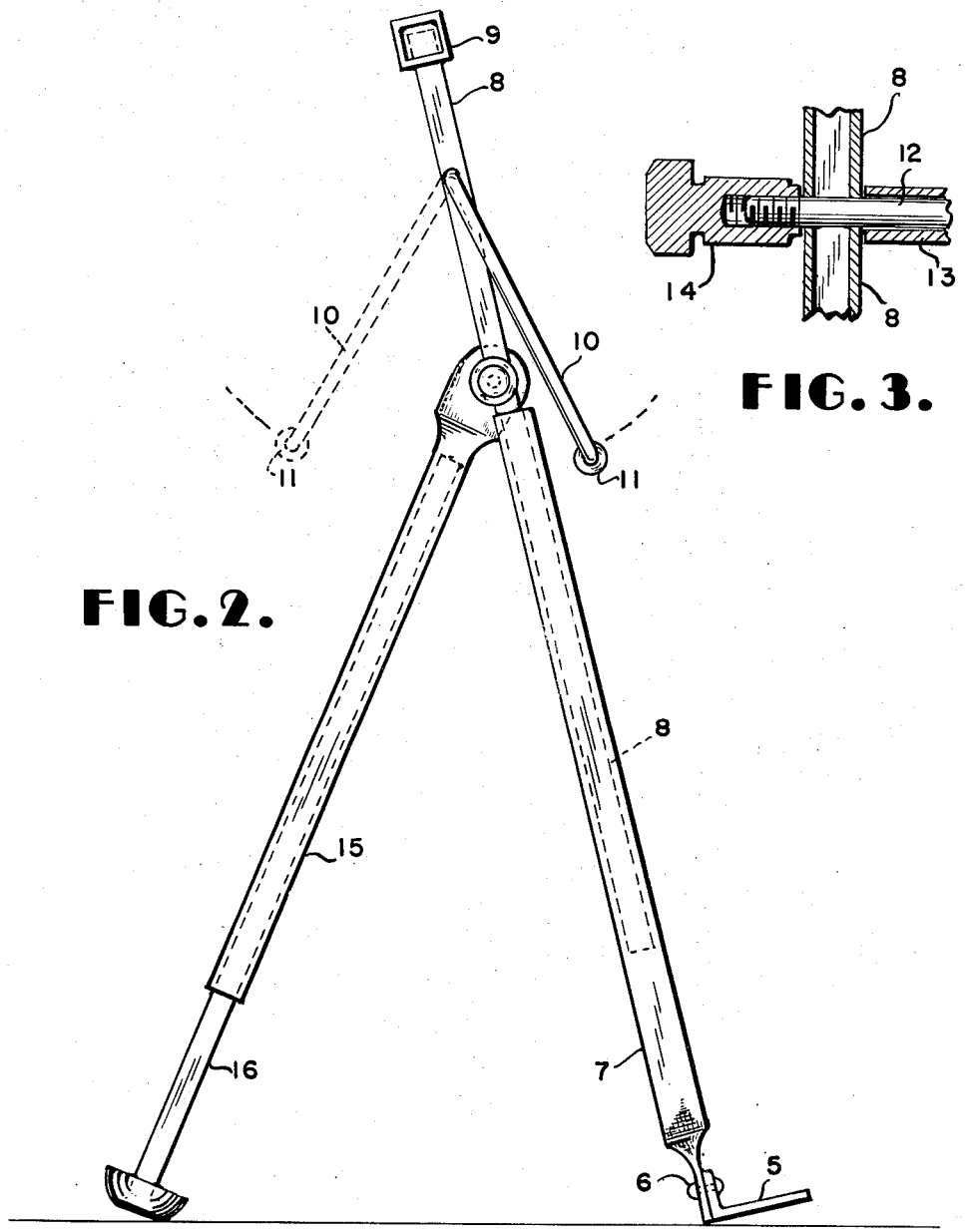
INVENTOR.
GEORGE W. MOORE
BY
Abraham Friedman Patented Sept. 18, 1951

2,568,354

UNITED STATES PATENT OFFICE 2,568,354

TABLE EASEL

George W. Moore, Hollis, N. Y.

Application July 15, 1950, Serial No. 174,049

3 Claims. (Cl. 248—195)

1

This invention relates to an easel for supporting a canvas and more particularly to a readily portable and adjustable easel adapted to rest upon a table or similar surface.

It is an object of this invention to provide an easel of simple construction which is capable of supporting a wide variety of canvas sizes and shapes and which may be readily adjusted for this purpose.

An additional object of this invention is to provide an easel capable of being readily carried from place to place and which is adapted for use on a table top or similar plane surface.

In order to accomplish some of these objects two frames movably related to each other and an adjustable supporting leg capable of being locked in fixed position by means of a screw arrangement are used.

Other and further objects of this invention will be made clear from the drawings, specifications and claims appended thereto or will otherwise be obvious.

In the accompanying drawings:

Figure 2 is a side view of the easel, and

Figure 3 is a sectional view showing the means used to clamp the easel in a given position.

Figure 1:
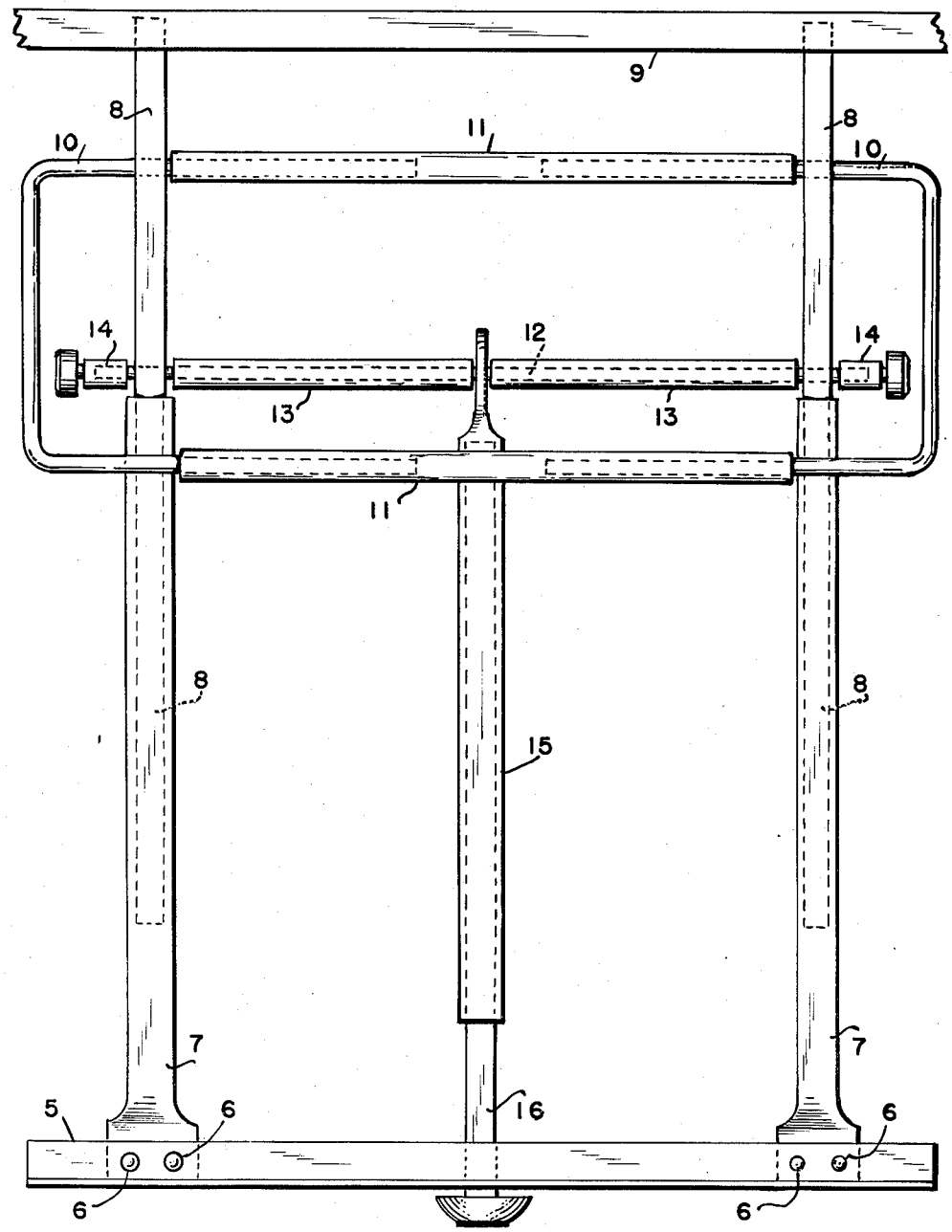
Figure 1 is a front view of the easel.

The canvas or drawing to be supported on the easel rests on the base 5. Attached to base 5 by rivets 6 or their equivalent are hollow vertical support members 7. Telescoping members 8 fit into the hollow of members 7 in a close fit and are capable of sliding up and down in the hollow of members 7. Top member 9 which acts to support a large size canvas when desired is detachably carried by telescoping members 8 by means of square holes in member 9 which detachably receive the ends of members 8. In the upper part of telescoping members 8 holes are provided through which U-shaped rods 10 pass. U-shaped rods 10 telescope into hollow rods 11 so that they can be adjusted to the width of the canvas. As can be seen from Figure 2 when top member 9 is removed from supports 8 the entire assembly 10, 11 may be swung out of the way in back of the easel.

Below the point where U-shaped rods 10 passes through members 8 are two holes through which rod 12 passes. Rod 12 is passed through hollow spacers 13 which are of equal length and are placed between supports 8. Between hollow spacers 13 is leg guide member 15 which is provided with a perforation at its upper end through which rod 12 is passed. Telescoping into leg guide member 15 is leg 16 which is fitted to close

2 tolerance. The two ends of rod 12 are threaded and on these threads are fitted tightening screws 14 as may be seen in Figure 3.

It can be seen that when tightening screws 14 exert thrust on members 8 this thrust tends to lock telescoping members 8 in hollow support members 7 because of the close tolerance between these parts. In addition, by tightening 14, hollow spacers 13 are brought closer together thereby clamping the leg assembly 15 and 16 at any given angle with respect to the plane of the front of the easel. Thus, it can be seen that the easel may be tilted at any angle with the vertical and will be supported by leg assembly 15 and 16. The entire assembly being rigidly held by means of screws 14. Besides clamping the leg assembly 15, 16 and support members 8, screws 14 tend to lock the rod 11 which is between rods 8 in position so that the frame 10, 11 cannot be rotated about the axis of rod 12. Therefore, when the rotatable frame 10, 11 is resting on the front of the canvas, tightening screws 14 tend to lock the rotatable frame in position.

Insertion of a canvas is simply accomplished by first removing member 9, loosening tightening screws 14 and rotating frame 10 behind the face of the easel. After these steps have been taken, the canvas is placed on base 5 with its back against supports 7 and 8, top 9 is put on if desired, the leg assembly is placed at the desired angle and screws 14 are tightened. Merely tightening screws 14 clamps the leg assembly.

When a further support than at the top and bottom is desirable it can be obtained through use of rotatable frame 10, 11. If this rotatable frame rests on the face of the canvas, it steadies the sides and part of the canvas. For a small canvas or book, the rotatable frame 10, 11 may be used to hold the canvas against a suitable backing since the height of supports 7 limits the extent to which top member 9 may be lowered. When screws 14 are level with the top of supports 7, no shorter canvases can be used with the easel. The rotatable frame adds considerable versatility and usefulness to the easel.

I have here shown and described a preferred embodiment of my invention. It will be apparent, however, that this invention is not limited to this embodiment and that many changes, additions and modifications can be made in connection therewith without departing from the spirit and scope of the invention as herein disclosed and hereinafter claimed.

Having described my invention, what I claim as new and desire to secure by Letters Patent is:

1. A table easel comprising a base member, two supporting members attached to said base member, said supporting members having means for adjusting their length, a top member having means for attaching it to one end of said supporting members, two holes in each supporting member, said holes being located so that one hole in each member is at the same distance from the end of said supporting members which has means for attaching said top member, an adjustable frame which passes through the holes of said supporting member nearest to said top member, said frame member thereby being able to pivot about the axis of said holes of said supporting member, a rod having threaded ends passing through the two remaining holes of said supporting member, said threaded portions of said rod extending outside of the space between said supporting members, a leg having means for adjusting its length and also having a hole near one end through which said rod passes, said leg being located on the portion of said rod between said supporting members, means for clamping said leg when said supporting means are pressed towards each other, two adjusting screws on the threaded ends of said rod; the whole being arranged so that said adjusting screws tend to press said supporting members toward each other thereby clamping said leg by virtue of said clamping means.

2. A table easel comprising a base member, two supporting members, said supporting members having means for adjusting their length, a top member having means for attaching it to one end of said supporting member, two holes in each supporting member, said holes being located so that one hole in each member is at the same distance from the end of said supporting member which has means for attaching said top member, an adjustable frame which passes through the holes of said supporting member nearest to said top member, said frame member having raised portions on the portion of it which passes between the holes of said supporting member, said raised portions being located near said supporting member whereby when said supporting members are brought close together said raised portions are contacted thereby preventing said frame from pivoting about the axis of the holes of said supporting member, a rod having threaded ends passing through the remaining holes of said supporting member, said threaded ends of said rod extending outside of the space between said supporting members, a leg assembly having means for adjusting its length and also having a hole near one end through which said rod passes, said leg being located on the portion of said rod between said supporting members, means for clamping said leg when said supporting means are pressed towards each other, said clamping means comprising two hollow tubes which said rod with threaded ends passes, two adjusting screws on the threaded ends of said rod; the whole being arranged so that said adjusting screws tend to press said supporting members toward each other thereby clamping said legs and also said adjustable frame.

3. A table easel comprising a base member, two supporting members, said supporting members having means for adjusting their length, said adjusting means clamping the supporting members at a given length when said supporting members are pressed towards each other, a top member having means for attaching it to one end of said supporting member, two holes in each supporting member, said holes being located so that one hole in each member is at the same distance from the end of said supporting member which has means for attaching said top member, an adjustable frame which passes through the holes of said supporting member nearest to said top member, said frame member having raised portions on the portion of it which passes between the holes of said supporting member, said raised portions being located near said supporting member whereby when said supporting members are brought close together said raised portions are contacted thereby preventing said frame from pivoting about the axis of the holes of said supporting member, a rod having threaded ends passing through the remaining holes of said supporting members, said threaded ends of said rod extending outside of the space between said supporting members, a leg assembly having means for adjusting its length and also having a hole near one end through which said rod passes, said leg being located on the portion of said rod between said supporting members, means for clamping said leg when said supporting members are pressed towards each other, said clamping means comprising two hollow tubes through which said rod with threaded end passes, two adjusting screws on the threaded end of said rod; the whole being arranged so that said adjusting screws tend to press said supporting members towards each other thereby clamping said leg, said adjustable frame and also said supporting members.

GEORGE W. MOORE.

REFERENCES CITED

The following references are of record in the file of this patent:

UNITED STATES PATENTS

| Number | Name | Date |
| --- | --- | --- |
| 1,564,594 | Leh | Dec. 8, 1925 |
| 2,519,711 | Sprechmann | Aug. 22, 1950 |
| 2,538,318 | Mitchell | Jan. 16, 1951 |